United States Patent

Marko et al.

[11] Patent Number: 5,945,497
[45] Date of Patent: Aug. 31, 1999

[54] METHOD FOR HYDROLYZING ORGANOCHLOROSILANES

[75] Inventors: Ollie William Marko, Carrollton; Denise Lynne McClure, Louisville, both of Ky.

[73] Assignee: Dow Corning Corporation, Midland, Mich.

[21] Appl. No.: 08/995,627

[22] Filed: Dec. 22, 1997

[51] Int. Cl.[6] ..................................................... C08G 77/06
[52] U.S. Cl. ............................... 528/12; 528/10; 528/20; 556/466
[58] Field of Search ................................. 528/10, 12, 20; 556/466

[56] References Cited

U.S. PATENT DOCUMENTS

| | | | |
|---|---|---|---|
| 4,221,691 | 9/1980 | Danielson et al. | 528/10 |
| 4,408,030 | 10/1983 | Marko | 528/10 |
| 4,774,347 | 9/1988 | Marko et al. | 556/466 |
| 4,960,523 | 10/1990 | Degen et al. | 210/721 |
| 4,961,861 | 10/1990 | Degen et al. | 212/717 |
| 5,000,934 | 3/1991 | Marko et al. | 556/465 |

*Primary Examiner*—Melvyn I. Marquis
*Attorney, Agent, or Firm*—Melvin D. Fletcher

[57] ABSTRACT

A process for treating a plurality of by-product streams containing chlorosilicon compounds. The process comprises the steps of determining the average SiCl functionality of a plurality of by-product streams comprising chlorosilicon compounds, blending at least two of the by-product streams to form a blended by-product stream having an average SiCl functionality greater than or equal to 2.8, adding to the blended by-product stream a surfactant having a HLB number within range of about 3 to 28, and contacting the blended by-product stream with an aqueous medium at a temperature within a range of about 50° C. to 120° C. to form a granular siloxane gel.

12 Claims, No Drawings

METHOD FOR HYDROLYZING ORGANOCHLOROSILANES

BACKGROUND OF INVENTION

The present invention is a process for treating a plurality of by-product streams containing chlorosilicon compounds. The process comprises the steps of determining the average SiCl functionality of a plurality of by-product streams comprising chlorosilicon compounds, blending at least two of the by-product streams to form a blended by-product stream having an average SiCl functionality greater than or equal to 2.8, adding to the blended by-product stream a surfactant having a HLB number within a range of about 3 to 28, and contacting the blended by-product stream with an aqueous medium at a temperature within a range of about 50° C. to 120° C. to form a granular siloxane gel.

Danielson et al., U.S. Pat. No. 4,221,691, teach that the addition of a relatively small amount of a hydrocarbon oil to a polyfunctional chlorosilicon composition prior to hydrolysis significantly improves the handling characteristics of the siloxane gel that is obtained. The term "polyfunctional chlorosilicon composition" was defined as "compositions containing a major proportion of chlorosilicon compounds with at least 3 chlorine radicals bonded to silicon per molecule". The method of Danielson et al., can not be used to successfully hydrolyze many of the by-product or waste streams of a commercial silicone plant to obtain a handleable gel since many of these streams may not contain sufficient polyfunctional chlorosilicon compounds. Furthermore, adding a hydrocarbon oil could present an additional expense in the waste treatment process.

Marko, U.S. Pat. No. 4,408,030, describes a process for treating a plurality of streams containing chlorosilicon compounds to obtain a solid siloxane material or gel that is easily handleable, however the gels may sink, float and/or stay suspended in the aqueous acid phase making separating the gels difficult.

Degen et al., U.S. Pat. Nos. 4,960,523 and 4,961,861 describe a process for working up the high-boiling, solids-containing residues obtained in the synthesis of organochlorosilanes which are hydrolyzed and then oxidized, comprising adding during hydrolysis and/or oxidation a surface-active agent which hydrophilicizes the surface of the solids.

The present invention provides a process for treating a plurality of by-product streams containing chlorosilicon compounds to produce a siloxane gel that is easily handleable, has a finer more uniform particle size, and floats on the liquid surface making the granular siloxane gel readily separable from the liquid phase than gels previously described. Furthermore, the present invention provides a process by which diverse by-product streams of a commercial silicone plant can be economically hydrolyzed to greatly reduce the chlorine content prior to disposal. Finally, the present invention provides a process for treating by-product chlorosilicon streams whereby hydrogen chloride may be recovered.

SUMMARY OF INVENTION

The present invention is a process for treating a plurality of by-product streams containing chlorosilicon compounds. The process comprises the steps of determining the average SiCl functionality of a plurality of by-product streams comprising chlorosilicon compounds, blending at least two of the by-product streams to form a blended by-product stream having an average SiCl functionality greater than or equal to 2.8, adding to the blended by-product stream a surfactant having a HLB number within a range of about 3 to 28, and hydrolyzing the blended by-product stream by mixing with an aqueous medium at a temperature between about 50° C. to 120° C. to form a granular siloxane gel.

DESCRIPTION OF INVENTION

The present invention is a process for treating a plurality of by-product streams containing chlorosilicon compounds. The process comprises the steps of determining the average SiCl functionality of a plurality of by-product streams comprising chlorosilicon compounds, blending at least two of the by-product streams to form a blended by-product stream having an average SiCl functionality greater than or equal to 2.8, adding to the blended by-product stream a surfactant described by formula $HO(CH_2CH_2O)_x(CH_2CH_3CHO)_y(CH_2CH_2O)_zH$, where x, y, and z are selected such that the surfactant has a HLB number within a range of about 3 to 28, and contacting the blended by-product stream with an aqueous medium at a temperature within a range of about 50° C. to 120° C. to form a granular siloxane gel.

The term "SiCl Functionality" of a given chlorosilicon compound is defined as the number of Si—Cl bonds in the chlorosilicon compound. For example, the SiCl functionality, f, of several chlorosilicon compounds are given as follows: $R_3SiCl$, f=1; $R_2SiCl_2$, f=2; $RSiCl_3$, f=3; $SiCl_4$, f=4; $RCl_2SiSiCl_2R$, f=4; $RCl_2SiSiClR_2$, f=3; $RCl_2SiOSiCl_3$, f=5; $Cl_3SiSiCl_3$, f=6; etc., where R is a non-chlorine radical. The average SiCl functionality of the by-product stream is the weighted average of SiCl functionality of all Si—Cl containing compounds in the stream. The non Si—Cl containing compounds and any unidentified compounds in the by-product stream are not considered in the determining the average SiCl functionality. The relative amounts of all Si—Cl containing compounds are normalized to 100% total in determining the average SiCl functionality of the by-product stream. In a similar fashion, the blended by-product stream average SiCl functionality is the weighted average of the SiCl functionality of all Si—Cl containing compounds in the blended streams where the relative amounts of the individual SiCl compound are normalized to 100%.

The average SiCl functionality of a plurality of by-product streams can be determined by gas-liquid chromatography (glc) once the various components of a given stream have been identified. The combined techniques of glc and mass spectrometry are very useful in making the initial identification of the SiCl compounds in a complex stream. Other analytical techniques may be used to determine the average SiCl functionality of the chlorosilicon content of the by-product streams.

The by-product streams may contain chlorosilicon compounds including organic substituted silanes, non-organic substituted silanes, disilanes, disiloxanes, silane oligomers, siloxane oligomers, silphenylenes and silalkyllenes in which at least one Si—Cl bond is present. In addition to the chlorosilicon compounds, the by-product streams may contain solvents, suspended silica metal fine, silica, and silicon containing compounds without any Si—Cl bonds. For example toluene, benzene, and ethylbenzene have been identified as by-products from the direct process production of methylchlorosilanes.

In a preferred embodiment of the invention, the by-product streams contain by-products from the production of commercial chlorosilicon monomers. Suitable by-products products include the high boiling residues from the direct process production of methylchorosilanes, the Grignard synthesis of phenylmethylchlorosilanes, the synthesis of phenylchlorosilanes via the reaction of benzene and trichlorosilane, and the synthesis of chlorosilanes. These by-products are complex mixtures that have little value because of the difficulty of separating the many components. The by-product streams major components are chlorosilanes, chlorodisilanes, chlorodisiloxanes, chlorosilphenylenes and chlorosilalkylenes.

Chlorosilicon compound contain by-product streams suitable for treatment by the present process also include, for example, distillation residues, distillation waste cuts, filtration residues, by-product or waste material from the production of commercial silanes, siloxane intermediates and siloxane polymers, and off-specification materials.

After determining the average SiCl functionality of a plurality of by-product streams, at least two of the by-product streams are blended to form a blended by-product stream having an average SiCl functionality greater than or equal to 2.8. By-product streams with an average SiCl functionality less than about 2.8, when employed in the process of the invention can yield an undesirable sticky paste.

In some cases, the order of various steps may be changed. For example, it may be more efficient to collect small samples of a plurality of by-product streams in a single holding tank, blend them and then determine the average SiCl functionality of the blended by-product stream. Blending should continue until the average SiCl functionality of the blended by-product stream is within the desired SiCl functionality limit.

The blending of the by-product streams to obtain a blended by-product stream of the desired average SiCl functionality can be achieved by standard methods such as stirring. The blending may be carried out in a batch, semi-continuous, or continuous mode.

The surfactants to be added to the blended by-product stream are described by formula $HO(CH_2CH_2O)_x$ $(CH_2CH_3CHO)_y(CH_2CH_2O)_zH$, where x, y, and z are selected such that the surfactant has a hydrophilic-lipophilic balance number (HLB) within the range of about 3 to 28. Preferred is a HLB number within the range of about 3 to 15. Most preferred is a HLB number within the range of about 3 to 7.

The surfactants useful in the present process are nonionic surfactants containing only carbon, hydrogen and oxygen. Anionic and cationic surfactants and those containing sulfur, nitrogen and phosphorus are less preferred because it is believed their chemical functionality may react with the chlorosilane or liberated hydrochloric acid and detrimentally impact the stickiness of the granular siloxane gel. Examples of suitable nonionic surfactants are ethylene oxide and propylene oxide block copolymers such as $HO(CH_2CH_2O)$ $(CH_2CH_3CHO)_8(CH_2CH_2O)H$ sold as Antarox® L-61, $HO(CH_2CH_2O)(CH_2CH_3CHO)_8(CH_2CH_2O)_2H$ sold as Antarox® L-62, $HO(CH_2CH_2O)(CH_2CH_3CHO)_8$ $(CH_2CH_2O)_4H$ sold as Antarox® L-64, and $HO(CH_2CH_2O)_2(CH_2CH_3CHO)_3(CH_2CH_2O)_8H$ sold as Antarox® F-88 FLK. These Antarox® surfactants formulas are expressed as composition averages and they are manufactured by Rhone-Poulenc, Cranbury, N.J. USA.

The surfactant concentration may comprise from about 0.5 to 50 weight percent of the blended by-product stream. The preferred surfactant concentration is from about 1 to 10 weight percent of the blended by-product stream.

The blended by-product stream with the appropriate average SiCl functionality and a surfactant described by formula $HO(CH_2CH_2O)_x(CH_2CH_3CHO)_y(CH_2CH_2O)_zH$, where x, y, and z are selected such that the surfactant has a HLB number within a range of about 3 to 28 are contacted with an aqueous medium under agitation to facilitate hydrolysis of the chlorosilicon compound. The blended by-product stream addition rate to the aqueous medium and the agitation rate of the resulting mixture can be used to control the particle size of the resulting granular siloxane gel. The aqueous medium may initially consist of only water, but after hydrolysis, liberated hydrogen chloride dissolves in the water. When the water becomes saturated with the hydrogen chloride, gaseous hydrogen chloride will be evolved. The aqueous medium may contain hydrochloric acid or an inorganic chloride salt initially so that gaseous hydrochloric acid is evolved even at the start of the hydrolysis. Inorganic salts such as sodium chloride or calcium chloride may be employed. The term "aqueous" means that the medium containing essentially water as the component reacting with the chlorosilicon compounds and excludes such organic components as alcohols which are also reactive with chlorosilicon compounds. In a preferred embodiment of the invention, gaseous hydrochloric acid is recovered from the hydrolysis and the aqueous medium consists of concentrated hydrogen chloride solution. The amount of aqueous medium employed can be varied widely, however it is preferred that sufficient water be present to completely hydrolyze the chlorosilicon compounds present in the blended by-product stream.

The contact of the blended by-product stream with the aqueous medium is conducted at a temperature between 50° C. to the boiling point of the aqueous medium. It is preferred that the contact be conducted at a temperature within a range of about 60° C. to 90° C. If the contact is conducted at temperatures significantly below 50° C., a sticky granular siloxane gel may result due to incomplete hydrolysis of the chlorosilicon compounds.

The hydrolysis reaction is endothermic when the aqueous medium comprises concentrated hydrochloric acid and heating may be employed to maintain the temperature. When the aqueous medium is only water, the hydrolysis reaction is exothermic and cooling may be employed to control the reaction.

The contact of the blended by-product stream may be conducted at atmospheric, sub-atmospheric, or super-atmospheric pressure. Because of economic considerations, it is preferred that the hydrolysis is run at or near atmospheric pressure.

The present process provides granular siloxane gels that are non-sticky, have finer uniform particle size, and float on the liquid surface making the granular siloxane gel readily separable from the aqueous medium. The granular siloxane gels may be removed from the liquid medium by any convenient manner such as filtration or centrifugation.

In an alternative embodiment of the present process the granular siloxane gels are washed with water one or more times to reduce the chlorine content of the granular siloxane gel.

The following examples are provided to illustrate the present invention. The examples are not intended to limited the scope of the present claims.

EXAMPLE 1

Samples were taken from a by-product storage tank containing a plurality of by-product streams containing chlorosilicon compounds. Each by-product stream sample was analyzed using glc and glc-mass spectrometry to determine the glc area percent of the by-product stream components. The by-product streams were categorized as "High Boiling Liquids" and "Distillation By-Products". The weight percent of each component of the High Boiling Liquids are recorded in Table 1 and the weight percent of each component of the Distillation By-Products are recorded in Table 2.

A 70/30 percent mixture of high boiling liquids and distillation by-products were blended to form a blended by-product stream resulting from a direct process for making ororganochlorosilanes. The blended by-product stream was analyzed using glc and determined to have an average SiCl functionality of 3.46. The blended by-product stream (200 g) was added to an agitated aqueous medium of 36 percent hydrochloric acid at 65° C. with stirring. The blended by-product stream was hydrolyzed for 0.25 hours and the aqueous medium removed by filtration. A non-uniform mixture of sinking, floating and suspended granular siloxane gels were formed.

EXAMPLE 2

The blended by-product stream prepared in example 1 was hydrolzed in the presence of two weight percent of a nonionic surfactant described by formula $HO(CH_2CH_2O)(CH_2CH_3CHO)_8(CH_2CH_2O)H$, purchased from Rhone-Poulenc, Cranbury, N.J. USA under the trade name Antarox° L-61. The surfactant had a HLB number of three which was experimentally determined or calculated by summing up the contributions of the surfactants' individual molecular structures. After the blended by-product stream was hydrolyzed, the aqueous medium was removed by filtration. The granular siloxane gels had finer uniform particle size, floated on the liquid surface and more readily separated from the liquid phase than the granular siloxane gels formed in Example 1.

EXAMPLE 3

The blended by-product stream prepared in example 1 was hydrolyzed in the presence of two weight percent of a nonionic surfactant described by formula $HO(CH_2CH_2O)(CH_2CH_3CHO)_8(CH_2CH_2O)_2H$, purchased from Rhone-Poulenc, under the trade name Antarox® L-62. The surfactant had a HLB number of seven which was experimentally determined or calculated by summing up the contributions of the surfactants' individual molecular structures. After the blended by-product stream was hydrolyzed, the aqueous medium was removed by filtration. The granular siloxane gels were of finer more uniform particle size, floated on the liquid surface and more readily separated from the liquid phase than the granular siloxane gels formed in Example 1.

EXAMPLE 4

The blended by-product stream prepared in example 1 was hydrolyzed in the presence of two weight percent of a nonionic surfactant described by $HO(CH_2CH_2O)(CH_2CH_3CHO)_8(CH_2CH_2O)_4H$, purchased from Rhone-Poulenc, under the trade name Antarox® L-64. The surfactant had a HLB number of 15 which was experimentally determined or calculated by summing up the contributions of the surfactants' individual molecular structures. After the blended by-product stream was hydrolyzed and the aqueous medium removed by filtration. The granular siloxane gels were of finer uniform particle size, floated on the liquid surface and were more readily separated from the liquid phase than the granular siloxane gels formed in Example 1.

EXAMPLE 5

The blended by-product stream prepared in example 1 was hydrolyzed in the presence of two weight percent of a nonionic surfactant described by $HO(CH_2CH_2O)_2(CH_2CH_3CHO)_3(CH_2CH_2O)_8H$, purchased from Rhone-Poulenc, under the trade name Antarox® F-88 FLK. The surfactant had a HLB number of 28 which was experimentally determined or calculated by summing up the contributions of the surfactants' individual molecular structures. After the blended by-product stream was hydrolyzed and the aqueous medium removed by filtration. The granular siloxane gels were of finer uniform particle size, floated on the liquid surface and were more readily separated from the liquid phase than the granular siloxane gels formed in Example 1.

TABLE 1

High Boiling Liquids

| Component | Weight Percent |
|---|---|
| $(SiCH_2Si)_1(Cl)_4(Me)_2$ | 32 |
| $(SiCH_2Si)_1(Cl)_5Me$ | 28 |
| $(HSiOSi)_1(Cl)3(Me)_2$ | 4 |
| $(SiOSi)_1(Cl)_4(Me)_2$ | 4 |
| $(SiCH_2Si)_1(Cl)_2(Me)_4$ | 3 |
| $(SiSi)_1(Cl)_4(Me)_2$ | 1 |
| Non-hydrolyzable or unknown | 7 |
| Solids | 22 |

TABLE 2

Distillation By-Products

| Component | Weight Percent |
|---|---|
| $Me_2SiCl_2$ | 37 |
| $EtMeSiCl_2$ | 17 |
| $SiCl_4$ | 10 |
| $Me_3SiCl$ | 8 |
| $MeSiCl_3$ | 3 |
| $MeHSiCl_2$ | 3 |
| $AlkylMe_2SiCl$ | 3 |
| $Me_2HSiCl$ | 2 |
| $EtMeSiCl_2$ | 1 |
| Non-hydrolyzable or unknown | 16 |

In the tables Me stands for methyl, Et stands for ethyl, H stands for hydrogen, and alkyl refers to any monovalent hydrocarbon bonded to silicon. In table 1 the formulas are presented as empirical formulas.

We claim:

1. A process for treating a plurality of by-product streams comprising chlorosilicon compounds, the process comprising the steps of (A) determining the average SiCl functionality of a plurality of by-product streams comprising chlorosilicon compounds, (B) blending at least two of the by-product streams to form a blended by-product stream having an average SiCl functionality greater than or equal to 2.8, (C) adding to the blended by-product stream a surfactant described by formula $HO(CH_2CH_2O)_x(CH_2CH_3CHO)_y(CH_2CH_2O)_zH$, where x, y, and z are selected such that the surfactant has a HLB number within a range of about 3 to 28, and (D) contacting the blended by-product stream with an aqueous medium at a temperature within a range of between 50° C. to 120° C. to form a granular siloxane gel.

2. A process according to claim 1, where the surfactant is described by formula $HO(CH_2CH_2O)(CH_2CH_3CHO)_8(CH_2CH_2O)H$.

3. A process according to claim 1, where the surfactant is described by formula $HO(CH_2CH_2O)(CH_2CH_3CHO)_8(CH_2CH_2O)_2H$.

4. A process according to claim 1, where the surfactant is described by formula $HO(CH_2CH_2O)(CH_2CH_3CHO)_8(CH_2CH_2O)_4H$.

5. A process according to claim 1, where the surfactant is described by formula $HO(CH_2CH_2O)_2(CH_2CH_3CHO)_3(CH_2CH_2O)_8H$.

6. A process according to claim 1, where the surfactant has a HLB number within a range of about 3 to 15.

7. A process according to claim 1, where the surfactant has a HLB number within a range of about 3 to 7.

8. A process according to claim 1, where the surfactant is nonionic.

9. A process according to claim 1, where the surfactant comprises about 0.5 to 50 weight percent of the blended by-product stream.

10. A process according to claim 1, where the surfactant comprises about 1 to 10 weight percent of the blended by-product stream.

11. A process according to claim 1, where the contacting of the blended by-product stream with the aqueous medium is effected at a temperature within a range of 50° C. to the boiling point of the aqueous medium.

12. A process according to claim 1, where the contacting of the blended by-product stream with the aqueous medium is effected at a temperature within a range of about 60° C. to 90° C.

* * * * *